May 26, 1925.

B. R. BENJAMIN ET AL 1,539,108

IMPLEMENT ATTACHMENT FOR TRACTORS

Filed Sept. 4, 1924      3 Sheets-Sheet 1

Inventors.
B.R.Benjamin
and A.Kowalsky,
By
Atty.

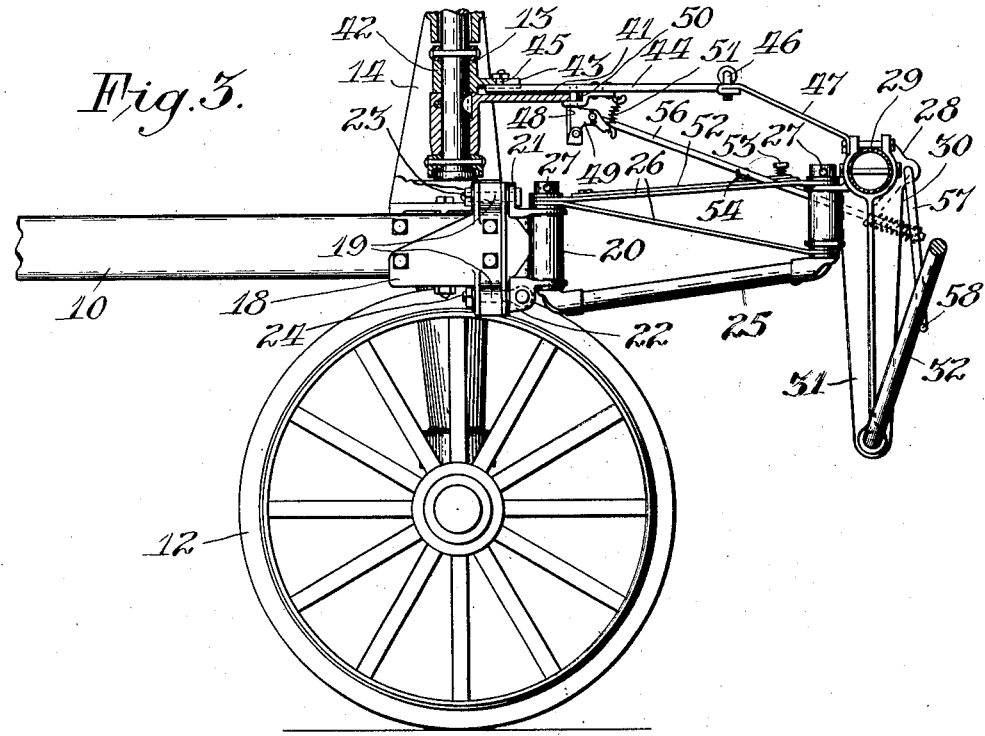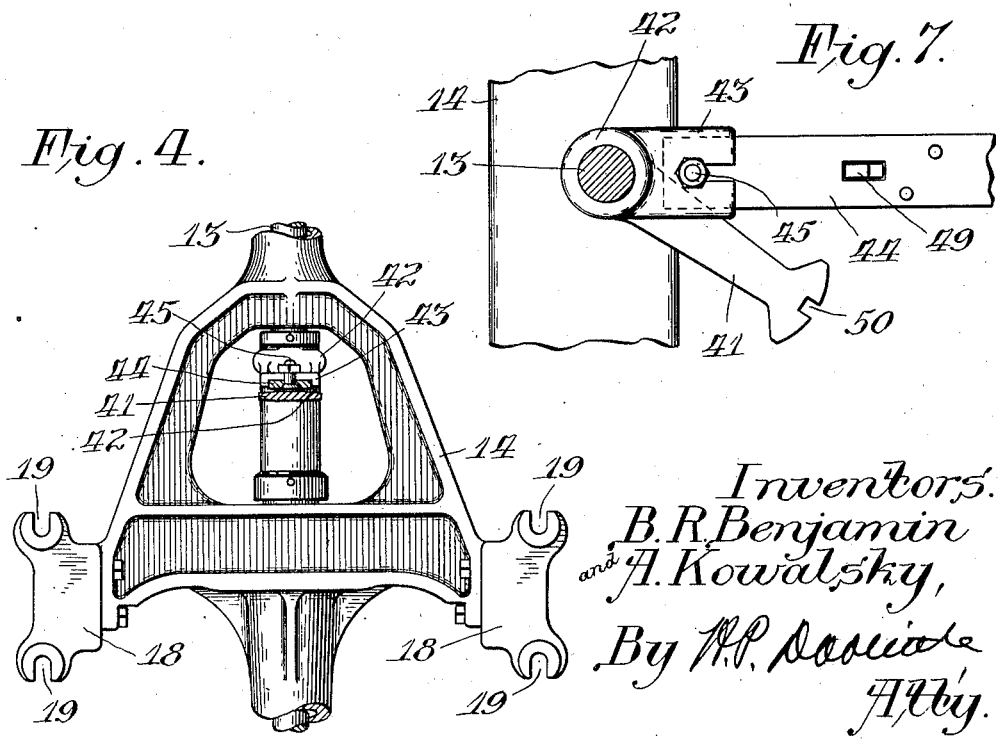

May 26, 1925.
B. R. BENJAMIN ET AL
IMPLEMENT ATTACHMENT FOR TRACTORS
Filed Sept. 4, 1924 3 Sheets-Sheet 3
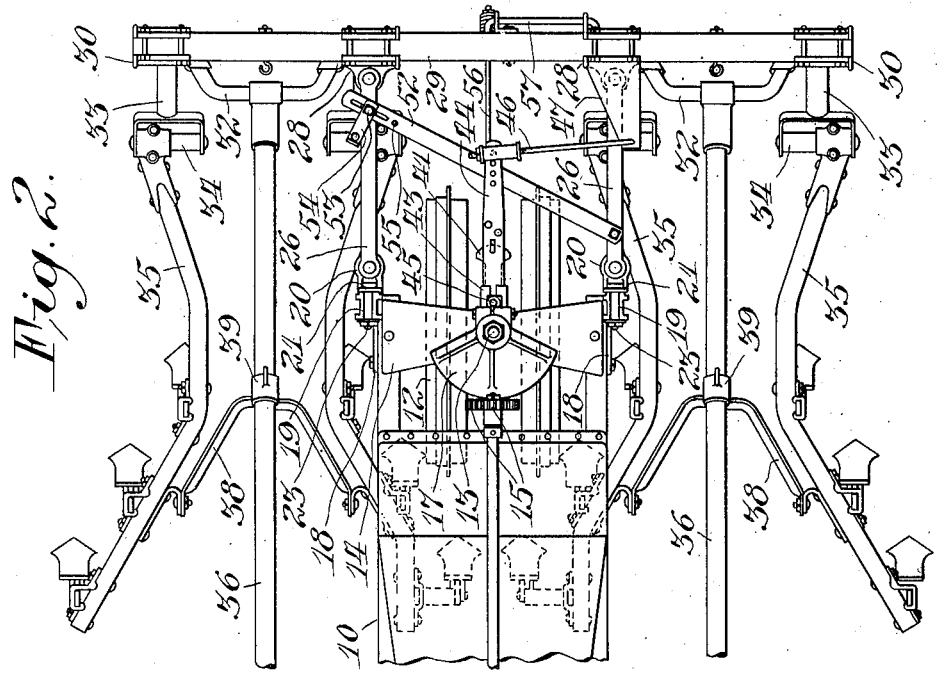
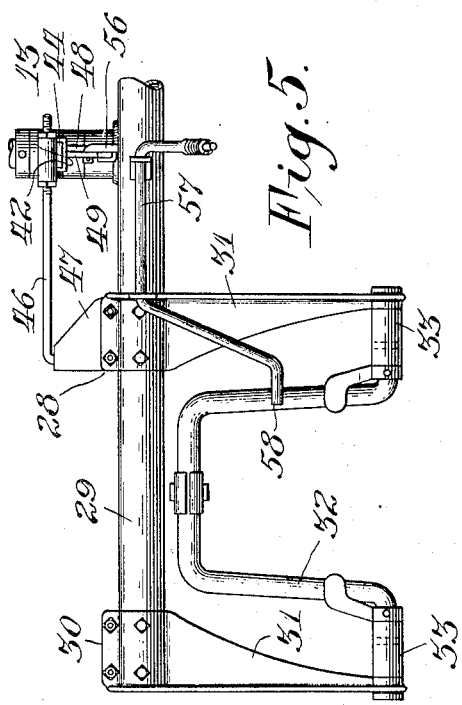
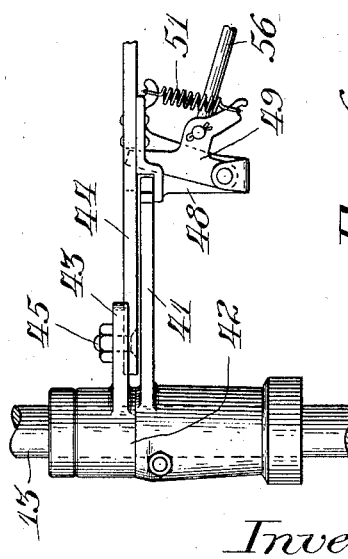
Inventors,
B. R. Benjamin
and A. Kowalsky,
By
Atty.

Patented May 26, 1925.

1,539,108

UNITED STATES PATENT OFFICE.

BERT R. BENJAMIN, OF CHICAGO, AND ANDREW KOWALSKY, OF OAK PARK, ILLINOIS, ASSIGNORS TO INTERNATIONAL HARVESTER COMPANY, OF CHICAGO, ILLINOIS, A CORPORATION OF NEW JERSEY.

IMPLEMENT ATTACHMENT FOR TRACTORS.

Application filed September 4, 1924. Serial No. 735,740.

*To all whom it may concern:*

Be it known that we, BERT R. BENJAMIN and ANDREW KOWALSKY, citizens of the United States, and residents, respectively, of Chicago, in the county of Cook and State of Illinois, and of Oak Park, in the county of Cook and State of Illinois, have invented certain new and useful Improvements in Implement Attachments for Tractors, of which the following is a full, clear, and exact specification.

This invention relates to implement attachments for tractors of the three-wheel type and is more particularly directed to improvements in the structure disclosed and claimed in assignee's co-pending application by Benjamin et al, Serial No. 576,481 filed July 1, 1922.

The main objects of the invention are to provide connections between a tractor and an implement frame which will permit the latter to be readily attached to and detached from the tractor frame and to provide coupling means having no loose or detached parts likely to be misplaced or lost. A further object is to simplify the construction of the supporting and controlling devices embodied in the machine.

The foregoing and other minor objects are accomplished by providing the tractor with supporting brackets which cooperate with coupling brackets on the implement supporting frame and are interlocked therewith in a novel and simplified manner as hereinafter described, the connections between the tractor and implement frame including also a simplified form of control mechanism between the steering post on the tractor and a laterally shiftable member on the implement frame, the details of construction and parts comprised in the invention being hereinafter more specifically described and defined in the claims.

Referring to the drawings,

Fig. 2 is a similar plan view of the forward portion of a tractor including the attachment;

Fig. 3 is a sectional side view of the forward end of the tractor and attachment;

Fig. 4 is a detail front view of a portion of the front of the tractor on which the attachment is supported;

Fig. 5 is a detail front view of a portion of the implement frame;

Fig. 6 is a detail side view of the connecting means between the steering post of the tractor and the implement frame; and Fig. 7 is a similar plan view.

Figure 1:
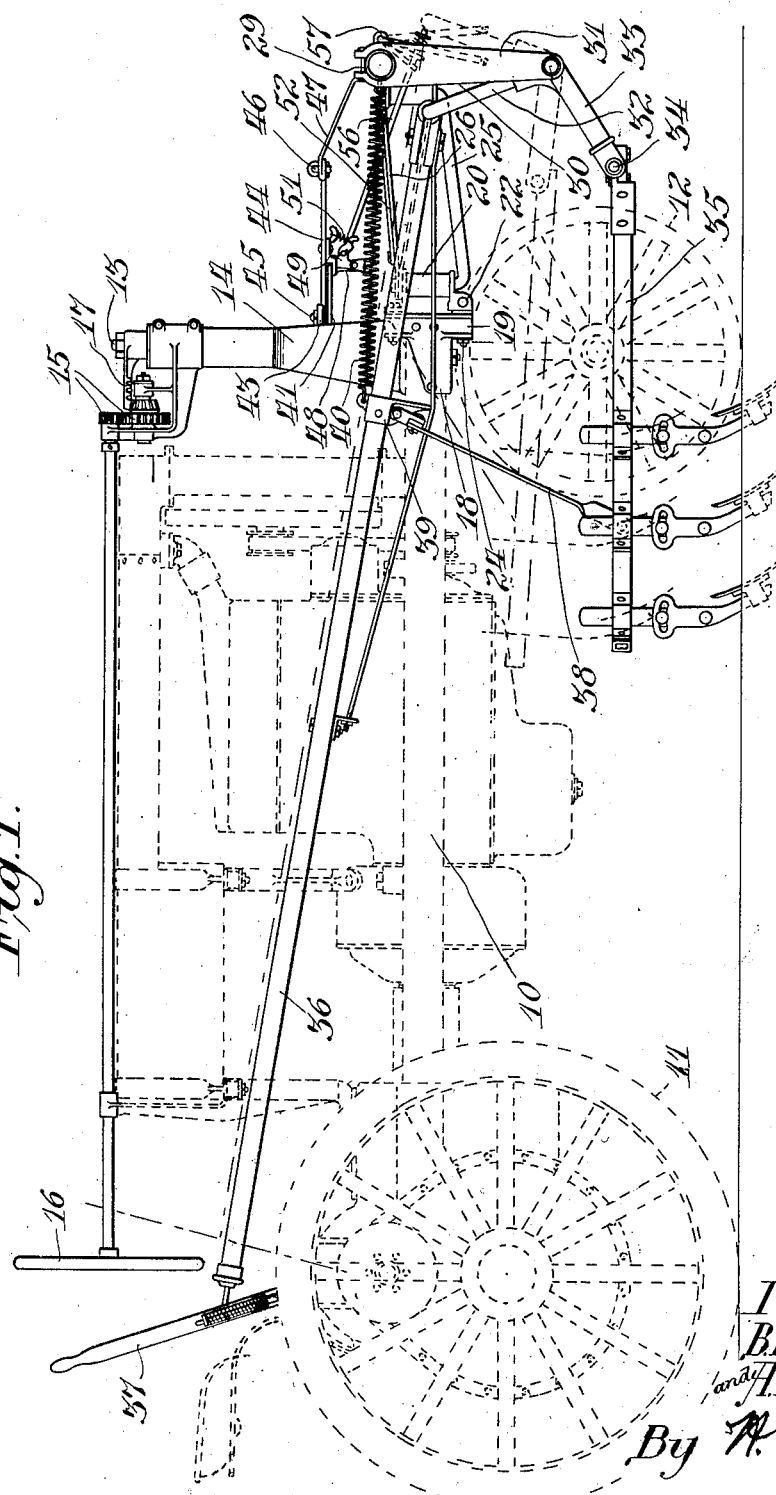
Fig. 1 is a side view of a tractor and cultivator attachment embodying the invention, the tractor being shown in dotted lines and the parts in which the invention is comprised being in full lines.

The tractor with which the attachment, in this instance a two-row cultivator, is combined is of a type having a comparatively narrow main frame or body 10 supported on widely spaced rear traction wheels 11 and on a single centrally positioned steering truck 12, these parts being shown in dotted lines on the drawings. The steering truck includes an upright steering post 13 journaled in the front cross member or casting 14 of the tractor frame, and the post 13 is controlled through gearing 15 which transmits movement of the steering rod and wheel 16 to a gear sector 17 on the upper end of the post. On the forward corners of the tractor frame at each side of the steering post there are secured supporting brackets 18, each of which is provided with oppositely facing, vertically spaced, U-shaped sockets 19. The brackets 18 cooperate with coupling brackets 20 on the implement frame having upper and lower lugs 21—22 positioned in alignment with the sockets 19. The upper lug 21 carries means for interlocking with the upper socket 19, shown in this instance as a clamp bolt 23 which passes through an opening in lug 21 and is engaged in the socket 19. The lower lug 22 is formed with parallel ears between which there is pivoted the end of a clamp bolt 24 which can swing towards or from the adjacent socket 19. The above construction affords a readily attachable and detachable connection between the tractor frame and the implement frame as removal of the attachment is easily effected by loosening and swinging out the lower bolt 24 after which loosening of the upper bolt 23 permits the attachment to be removed from the brackets 18, the clamp bolts remaining on the brackets 20. Mounting of the attachment by reversing those steps is equally easy.

Each coupling bracket 20 includes a vertical socket in which is pivoted one of a pair of forwardly extending shiftable arms 25. These arms are preferably formed with upturned ends, as illustrated, with the inner ends thereof received in the sockets of brackets 20 and retained there by any suitable means such as tie rods 26 and cotter pins 27 shown in the drawings. The outer upturned ends of arms 25 are journaled in vertical sockets in clamp brackets 28 supporting the central portion of a transversely extending elongated frame bar 29 which is preferably tubular in form as illustrated. The arms and cross member just described provide a frame which is laterally shiftable with respect to the tractor, carrying with it such implements as may be secured to the transverse frame member 29. In this instance the transverse member is shown as supporting a pair of cultivator beams on each outer end, each pair of beams comprising clamp brackets 30, each formed with an integral depending arm 31 (Fig. 5), thus providing a pair of rigid depending arms on the transverse member 29 at each side of the steering truck, the arms forming part of the supporting frame for the cultivator beams. In the lower ends of each pair of depending arms 31 there is journaled the horizontal ends of upwardly arched crank-shafts 32 and on these horizontal ends there is secured a pair of rearwardly extending draft brackets 33 on the ends of which there are mounted wrist pins 34 pivotally supporting the forward ends of the cultivator beams 35. Each pair of beams is, therefore, positioned adjacent one side of the steering truck and may extend to the rear thereof and by reason of the pivoted arms 25 the beams may be shifted laterally with respect to the truck. To the central parts of the upwardly arched or cranked portions of the shafts 32 there are pivoted the forward ends of operating rods 36 which extend rearwardly to an operating lever 37 on the rear of the tractor. Each pair of the cultivator beams 35 is connected near the rear end by a spreader arch 38, the upper portion of which is pivotally connected to a collar 39 on rod 36. Preferably, each collar 39 is provided with attaching means for a lifting spring 40, the other end of which is secured to member 29. It will be clear from the construction just described that as operating rod 36 is moved by the lever 37 the crankshaft 32 will be swung and the rearwardly extending arms of brackets 33, which are at right angles to the crank or arch of shaft 32, will move upwardly and downwardly, thereby raising or lowering the front ends of the cultivator beams attached thereto. At the same time the spreader arch 38 will cause the rear ends of the beams to be raised and lowered, thus giving a substantially parallel lift to the beams.

The simplified connections through which the lateral movement of the implement frame for guiding the cultivator beams is effected will next be described. As best seen in Figs. 3, 4 and 7, the steering post 13 has fixed thereto at a point above the implement frame a forwardly extending arm 41 which moves with the steering post, and just above this arm there is journaled or pivoted on the steering post a collar 42 provided with a forwardly extending lug 43. The lug 43 has a longitudinally extending notch or slot therein and is channeled on the under side to receive the rear end of a forwardly extending swing bar 44 carrying a clamp bolt 45 which engages the said slot. The bar 44 is positioned just above the arm 41 and the forward end of this bar is connected by a link or rod 46 with a rearwardly extending arm 47 on a transverse member 29. In order to cause bar 44 and arm 41 to swing in unison for guiding the cultivator beams, the bar 44 is provided with a depending arm 48 at a point adjacent the end of arm 41, the lower end of the arm 48 being upturned, as best shown in Fig. 6, and within the upturned portion there is pivoted the lower end of a latch member 49, the upper end of which engages a slot in the bar 44 registering with a notch 50 in the end of arm 41 when that arm and bar 44 are in alignment. A tension spring 51 (Fig. 6) connects the latch 49 and bar 44 and normally retains the latch in engagement with the notch 50 in arm 41. When so engaged arm 41 and bar 44 will partake of movement imparted to the steering post, and the implement frame will be correspondingly shifted laterally in an amplified degree, the extent of such lateral shifting movement being limited by the slotted rod 52 (Fig. 2) connecting one of the arms 25 with a pin 53 on the other. This pin engages the slot in rod 52 and is preferably provided with a pivoted latch 54 which may be swung into parallel relation with bar 52 and carries a pin on its under side adapted to engage an opening 55 in bar 52 for locking the parts against movement during transport. Release of latch 49 from notch 50 in arm 41 releases the cultivator attachment from the steering post and permits free movement of the steering post without affecting bar 44, as illustrated in Fig. 7, thus permitting the tractor to be steered in the ordinary manner. To effect this disconnection automatically by raising of the cultivator beams, the latch 49 is connected by means of a rod 56 with a crank lever 57 (Figs. 3 and 5) journaled on the transverse member 29 and provided with an extended cranked end 58 located in the path of movement of one of the arched shafts 32. With this arrangement the outward movement of the arched shaft 32, as the cultivator beams are raised, will cause the crank arm 58 of shaft 57 to be engaged by the arch and this shaft swung in a direction to exert a pull on rod 56 and latch 49 withdrawing the latch from notch 50 and disconnecting the implement frame from the steering post. Lowering of the beams will, of course, release the latch and permit it to engage arm 41.

The construction described, therefore, includes simplified, quickly detachable couplings between a tractor and an implement frame of the character described, it being clear that the clamp bolts connecting the coupling brackets 20 to the supporting brackets on the tractor, as well as the bolt connecting bar 44 to collar 42, can be easily and quickly clamped and unclamped as desired and that none of the bolts must be removed from the elements carrying them.

While the above disclosure exemplifies the preferred form of the invention, it will be obvious that certain modifications may be made without departure from the gist of the invention as defined in the following claims.

What is claimed as new is:

1. The combination with a machine comprising a tractor having a steering truck including an upright steering post journaled in the front of the tractor frame and a laterally shiftable implement frame carried in front of the truck; of quick detachable coupling means between the tractor and implement frame comprising supporting brackets on the tractor at each side of the steering post, coupling brackets on the implement frame including elements interlocking with the supporting brackets, and operating connections between the implement frame and steering post comprising a forwardly projecting arm fixed on the steering post, a collar pivoted on the post adjacent said arm having a forwardly extending lug, a swing bar with one end connected to said lug and its other end connected to the implement frame, and a latch mounted on said bar in position to interlock with the outer end of said arm.

2. The combination with a machine comprising a tractor having a steering truck including an upright steering post journaled in the front of the tractor frame, a laterally shiftable frame carried in front of the truck, and vertically shiftable implement carrying beams carried by said shiftable frame; of supporting brackets on the tractor at each side of the steering post, coupling brackets on the shiftable frame including elements interlocking with the supporting brackets, and operating connections between the shiftable frame and steering post comprising a forwardly projecting arm fixed to the steering post, a collar pivoted on the post adjacent said arm and having a forwardly extending lug, a swing bar with one end connected to said lug and its other end connected to the shiftable frame, a latch mounted on said bar and normally engaging the end of said arm, and controlling mechanism connecting the implement beams and latch.

3. The combination with a machine comprising a tractor having a central front steering truck and an implement frame carried ahead of the truck; of quick detachable coupling means between the tractor and frame comprising supporting brackets fixed to the tractor at each side of the truck each formed with oppositely facing U-shaped sockets, and coupling brackets on the frame having fastening members seated in said sockets.

4. The combination with a machine comprising a tractor having a central front steering truck and an implement frame carried ahead of the truck; of quick detachable coupling means between the tractor and frame comprising supporting brackets fixed to the tractor at each side of the truck each formed with oppositely facing U-shaped sockets, and coupling brackets on the frame having fastening members seated in said sockets certain of said members being pivoted on the coupling brackets to swing towards and from the U-shaped sockets.

5. A coupling for tractor implements comprising the combination with a tractor frame of a supporting bracket thereon provided with oppositely facing vertically spaced U-shaped sockets, an implement frame having a coupling bracket provided with portions aligned with said sockets, and clamp bolts engaging said sockets and aligned portions, one of said bolts being pivotally mounted at one end on one of said brackets to swing in a vertical plane towards and from a socket.

6. A coupling for tractor implements comprising the combination with a tractor frame of a supporting bracket thereon provided with oppositely facing U-shaped sockets, an implement frame having a coupling bracket formed with portions in alignment with said sockets, and connecting means interlocking with said portions and sockets including a bolt pivoted on one of said aligned portions to swing towards and from a socket.

In testimony whereof we affix our signatures.

BERT R. BENJAMIN.
ANDREW KOWALSKY.